United States Patent

Petschauer et al.

[11] Patent Number: 5,868,903
[45] Date of Patent: Feb. 9, 1999

[54] DEVICE FOR DEWATERING AND/OR WASHING SUSPENSIONS, IN PARTICULAR SUSPENSIONS OF FIBROUS MATERIALS

[75] Inventors: Franz Petschauer, Lannach; Johann Sbaschnigg; Wilhelm Mausser, both of Graz, all of Austria

[73] Assignee: Andritz-Patentverwaltungs-Gesellschaft m.b.H., Graz, Austria

[21] Appl. No.: 817,039

[22] PCT Filed: Oct. 12, 1995

[86] PCT No.: PCT/EP95/04022

§ 371 Date: Apr. 14, 1997

§ 102(e) Date: Apr. 14, 1997

[87] PCT Pub. No.: WO96/11734

PCT Pub. Date: Apr. 25, 1996

[30] Foreign Application Priority Data

Oct. 14, 1994 [AT] Austria ...................................... 1944/94

[51] Int. Cl.[6] .................................................... B01D 33/52
[52] U.S. Cl. .......................... 162/301; 100/118; 100/120; 210/401; 162/323; 162/358.1
[58] Field of Search ..................................... 162/318, 300, 162/301, 358.1, 323; 210/400, 401; 100/118, 120

[56] References Cited

U.S. PATENT DOCUMENTS

| 3,832,282 | 8/1974 | Parker | 162/303 |
| 3,839,143 | 10/1974 | Suckow | 162/301 |
| 3,915,865 | 10/1975 | Hajietal. | |
| 3,980,518 | 9/1976 | Ljung et al. | 162/303 |
| 4,543,161 | 9/1985 | Fujimoto | 162/323 |

FOREIGN PATENT DOCUMENTS

| 013548 | 7/1980 | European Pat. Off. . |
| 331834 | 9/1989 | European Pat. Off. . |
| 454989 | 11/1991 | European Pat. Off. . |
| 2322155 | 5/1973 | Germany . |
| WO 87/06282 | 10/1987 | WIPO . |

Primary Examiner—Karen M Hastings
Attorney, Agent, or Firm—Alix, Yale & Ristas, LLP

[57] ABSTRACT

The invention refers to a device for dewatering and/or washing suspensions, especially fibre stock suspensions, with two dewatering rolls rotating in opposite directions, where at least a further two guide rolls, especially press rolls, are provided and a woven, especially endless woven, wire or filter belt runs over each combination of one dewatering roll and one further guide roll, by which arrangement the suspension to be dewatered and/or washed is carried in the gap between the two belts and dewatered. The invention is mainly characterised by the two belts forming a vertical gap and by a device to guide the belts being mounted in the region of this vertical gap.

31 Claims, 5 Drawing Sheets

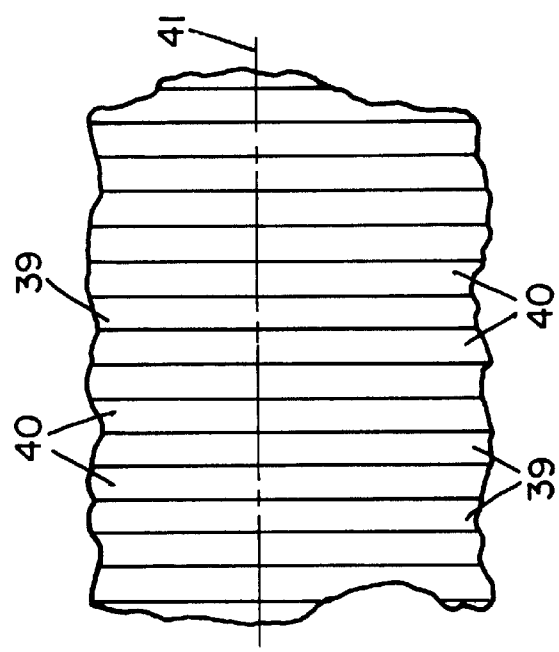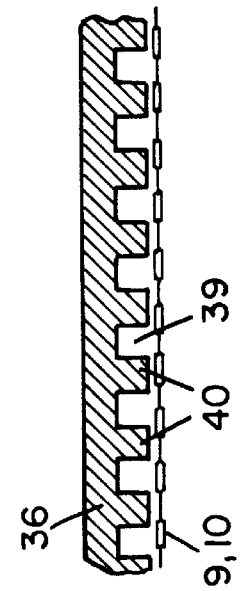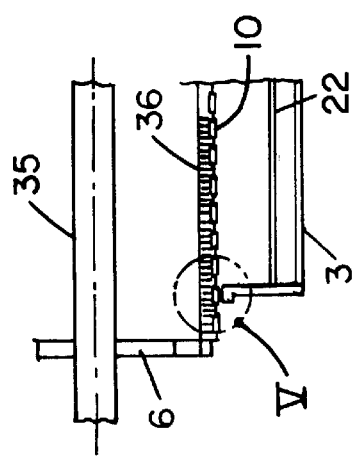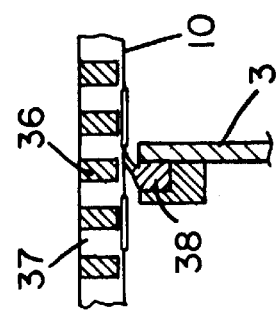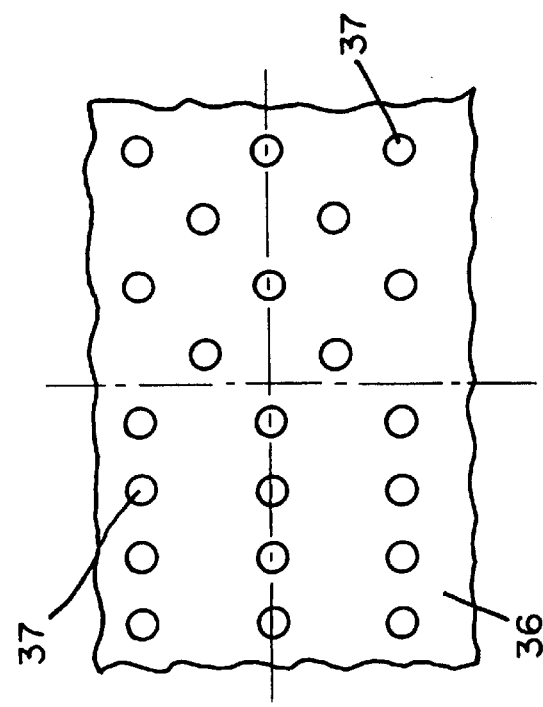

DEVICE FOR DEWATERING AND/OR WASHING SUSPENSIONS, IN PARTICULAR SUSPENSIONS OF FIBROUS MATERIALS

BACKGROUND OF THE INVENTION

The invention relates to a device for dewatering and/or washing suspensions, especially fibre stock suspensions, with two dewatering rolls rotating in opposite directions, where at least a further two guide rolls, especially press rolls, are provided and an endless woven wire or filter belt runs over each combination of one dewatering roll and one further guide roll, by which arrangement the suspension to be dewatered and/or washed is carried in the gap between the two belts and dewatered.

The devices already known have, in some cases, only two dewatering rolls rotating in opposite directions or are so-called twin wire dewatering units in which additional guide rolls and suitable wire or filter belts for dewatering are provided in addition to the dewatering rolls. Furthermore, the converging wire or filter belts run horizontally in most of these devices. Such devices can be used advantageously for dewatering, especially dewatering of fibre stock suspensions, blat have no facility for washing the suspension. If the suspension sometimes has to be washed and at other times is required without being washed for different application, large scale adjustments or modifications have to be made when using the devices already known.

EP-A-0 454 989 describes a vertical former with various form elements, where the suspension is injected into the gap between the belts. The first dewatering takes place in the roll gap or slot.

EP A-0 311 834 describes a dewatering device where sludge, fruits and vegetables or waste of pressed fruits or vegetables are dewatered by dewatering cogwheels. Here the material to be dewatered is fed through a chute arranged above the cogwheels, and falls onto the cogwheels and the belts. The belts are driven around the respective cogwheel, a deflecting roll and a (belt) dewatering roll. Important for this document is that the belts are driven together only on a short distance to reduce the wear.

U.S. Pat. No. 3,915,865 describes a dewatering device where the sludge is first led along a horizontal path while being dewatered by gravity. Then the belts are deflected by press rolls and guided together to a vertical gap from top to bottom.

SUMMARY OF THE INVENTION

The aim of the invention is to create a universally applicable device for dewatering and also for washing suspensions if necessary.

The invention is thus characterised by the two belts forming a vertical gap or slot and by a device to guide the web being mounted in the region of this vertical gap, which device can take the form of a guide roll or a guide or sliding plate. Arranging the gap vertically on the one hand avoids any re-wetting of the material that has already been dried and on the other hand, a high throughput can be achieved on a very small floor area. By including a device to guide the web, formed by the dewatered material in the vertical slot, such as a guide roll or a guide or sliding plate, for example, the belts in the region of the vertical gap are maintained under suitable pressure, thus guaranteeing the required dewatering effect.

A favourable further development of the invention is characterised by curved guiding plates or jackets being mounted over the width of both dewatering rolls to form an adjustable, narrowing gap between the guiding plates or jackets and the wire or filter belts, especially endless woven wire or filter belts, which run over the surface of the dewatering rolls and then over the further guide rolls. These curved guiding plates are mounted on swivel bearings and can be divided, if necessary, into at least two sections, each with an adjustable inlet gap between the guiding plate and the roll surface. The inclusion of guiding plates allows the pressure on the suspension to be increased continuously in a particularly favourable way and thus permits sufficient dewatering. If the guiding plates are mounted on swivel bearings, this pressure can he varied and adjusted accordingly. The division of the guiding plates into several sections allows washing liquid to be fed in at the edges of the sections in a particularly favourable way to the filter cake or pulp mat which has already formed. If the guiding plates are divided, it is also possible to apply the pressure more accurately during dewatering operations only A favourable further development of the invention is characterised by at least the fixed part of the guiding plates or jackets being tightly connected to the tray mounted below the dewatering rolls and which has a separate section to collect and direct the washing liquid, especially wash water. In this way, the suspension can be fed more specifically to the surface of the rolls and a simple means is also provided to separate the suspension from the washing liquid.

A favourable configuration of the invention is characterised by the dewatering rolls forming a roll gap in the region of up to 100 mm. preferably between 2 and 20 mm, and which is also adjustable, where the best results in terms of dewatering and washing are obtainable in the preferred range.

An advantageous further development of the invention is characterised by the stock being supplied separately and from both, i.e., opposite sides of the tank. This provides a particularly favourable means of dividing and distributing the suspension evenly.

An advantageous configuration of the invention is characterised by the tank on headbox being sealed off towards the dewatering rolls and against the belt by radial-action seals. With this design, pre-dewatered suspension is guided towards the seals, especially in the event of leakages, thus creating an improved sealing effect. The seals normally used in the past suffered bulging or were destroyed as a result of the increased pressure.

A favourable further development of the invention is characterised by the headbox being tilted or run out of the operating position into a cleaning position. This design permits easy cleaning of the device during shutdowns.

A further advantageous embodiment of the invention is characterised by a take-off device, especially a pulp discharge screw, for the filter cake or pulp mat formed by the suspension being installed after the vertical gap formed by the belts running over the dewatering rolls and the further guide rolls, as well as after the further guide rolls, especially press rolls, the walls of which take-off device can be designed as doctors. Since the gap is vertical, rewetting of the dry filter cake or pulp mat is avoided, thus resulting in higher drynesses. In addition, the pulp is discharged at a favourable height for subsequent units, permitting the pulp to be fed directly into a disperger, for example, without an intermediate unit being required. Since the take-off device has specially shaped walls in the form of doctors, the filter cake or pulp mat is removed properly from the wire or filter belts.

A favorable configuration of the invention is characterised by filtrate drains, especially filtrate trays, being provided underneath the further guide rolls, especially press rolls. With this configuration, different grades of filtrate, especially very pure clear filtrate, can be drained away from the machine and used in other applications.

A favourable further development of the invention is characterised by a stretcher roll to apply and regulate the belt tension being provided for each belt after the further guide roll, especially press roll, and before the dewatering roll when viewed in the running direction of the wire or filter belts wrapped round the dewatering rolls, which stretcher roll can be designed as a regulating roll for belt centering. In this way, only one roll is required, thus leading to a smaller design. Furthermore, this eliminates the need for an external roll which would be subject to corresponding pulp deposits and dirt collecting on the roll.

A favourable embodiment of the invention is characterised by at least one of the further guide rolls being driven, where the main load for the drive can be taken from the further guide roll, especially press roll. For this reason the belt tensions throughout the entire unit can be reduced, which results in longer service life for the belts.

A favourable configuration of the invention is characterised by the further guide rolls having a smooth surface.

An advantageous configuration of the invention is characterised by the further guide rolls having a rubber covering. The rubber covering reduces wear on the wire and also permits better power transmission to the wire if the roll is driven.

A favourable configuration of the invention is characterised by the further guide rolls having a grooved surface or bore holes in the surface, in which case they can be designed as perforated rolls. With such designs, particularly good drainage of the water pressed out of the suspension is achieved in the region of the further guide rolls.

An advantageous embodiment of the invention is characterised by a hood being provided whereby a completely enclosed unit is formed.

A favourable configuration of the invention is characterised by the dewatering rolls being perforated. Due to the perforations in the dewatering rolls, dewatering is also possible through the outer shell of the dewatering rolls to the inside of the roll, which permits a particularly good dewatering effect.

A favourable further development of the invention is characterised by the dewatering rolls having grooves in the roll surface. If the dewatering rolls have a grooved surface, the filtrate can be drained off efficiently, which feature can be combined with roll perforations in the base of the grooves to substantially improve dewatering.

BRIEF DESCRIPTION OF THE DRAWINGS

In the following the invention is described in examples based on the drawings, in which FIG. 1 contains a view of the device according to the invention, FIG. 2 a sectional view of the lower section of the device according to FIG. 1, FIG. 5a shows the surface of a deflection roll designed as a perforated roll, FIG. 6 a further variant of a deflection roll, FIG. 6a a sectional view through FIG. 6, FIG. 7 contains a further development of a grooved roll.

DESCRIPTION OF THE PREFERRED EMBODIMENT

Figure 1:
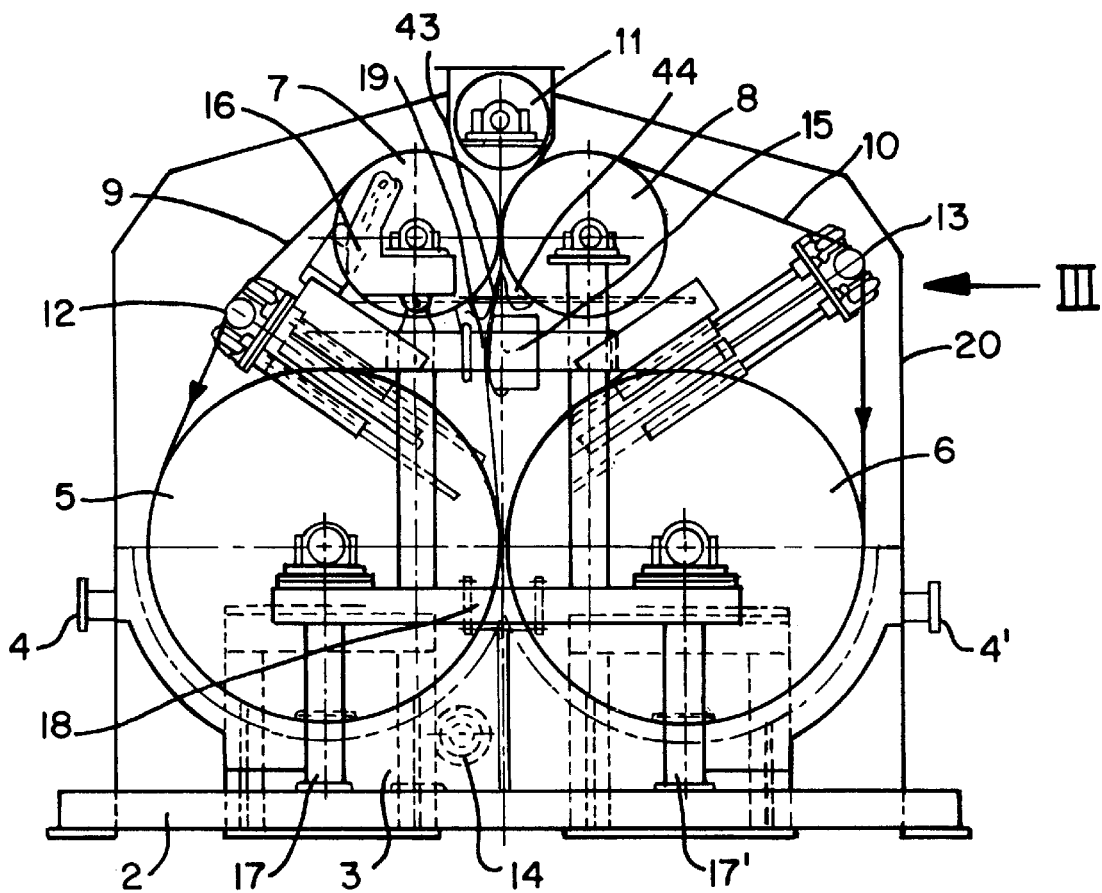

FIG.1 shows a view of the dewatering device on apparatus 1, supported on a foundation 2. On this foundation 2 there is also a tank or head box 3 to which the suspension to be dewatered and/or washed is fed through inlet branches 4, 4'. Located above this tank 3 are the laterally arranged dewatering rolls 5, 6, followed by the guide rolls 7, 8, which are designed here as press rolls. A wire or filter belt 9 runs round the dewatering roll 5 and the press roll 7. Similarly, a wire or filter belt 10 also runs round the dewatering roll 6 and the press roll 8. In order to remove the pulp mat from the wire belts 9, 10, there is a pulp discharge screw 11 mounted at the machine outlet between the press rolls 7, 8. The required tension on the wire belts 9, 10 is applied by stretcher and regulating rolls, 12, 13. The right-hand section of the illustration (dewatering roll 6, press roll 8, wire bell 10, stretcher and regulating roll 13) shows the stretcher and regulating roll 13 in its operating position. In the left-hand section, the stretcher and regulating roll 12 is shown in the position for no tension on the wire 9, which setting is provided particularly for wire changing purposes. In the lower section of the tank 3 there is also a feed branch 14 for supplying washing liquid, e.g. wash water. A further improvement in belt guidance is obtained using a guide shoe 15, installed in the area where the wire belts 9 and 10 run parallel between the dewatering rolls 5, 6 and the press rolls 7,8. This provides the required stabilising effect on the web and applies the required pressure in the vertical gap. In order to generate the required pressing force, the press roll 7 can be pressed onto press roll 8 by means of a lever 16, which is tilted by means of an hydraulic or pneumatic cylinder. The device can be fully cantilevered for changing the endless woven wires 9 and 10. Detachable inserts 17, 17', 18 and 19 are provided in the frame such that the endless woven wire belt 9 and/or 10 can be pulled out of the device without removing the rolls and replaced with a new filter belt. A hood 20 is mounted above the tank 3 and the rolls inside it in order to avoid any adverse effects on the environment or for the operating personnel due to formation of steam or any other vapours. Filtrate trays 43, 44 are provided underneath the press rolls 7, 8 to carry the press filtrate away from the machine.

Figure 2:
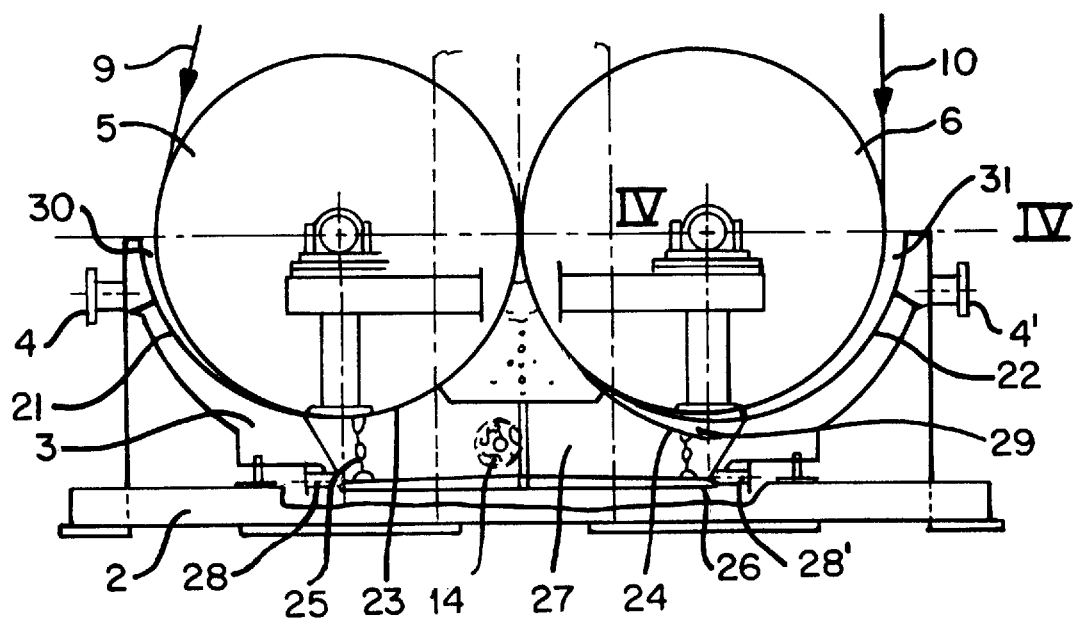

FIG. 2 shows a sectional view of the bottom section of FIG. 1. The same elements are marked here with the same reference numbers. The present illustrations shows, in particular, the arrangement of guiding plates or jackets and in particular guiding plate sections 21, 22, 23 and 24. The left-hand portion shows the device in the dewatering or thickening mode. Here, the guiding plate sections 21 and 23 are set such that they form a constantly narrowing gap 30 between the lower peripheral surface of the dewatering roll 5 and the wire 9 running round the dewatering roll 5. The guiding plate section 23 is pressed here onto the outlet of guiding plate section 21 by a cylinder 25. On the right-hand side of FIG. 2, the device is shown in the washing mode. The fixed guiding plate section 22 here forms a narrowing gap 31 with the lower peripheral surface of the dewatering roll 6 and the wire 10 running round the dewatering roll 6. The tank 3 has a separate section 27 where washing liquid, e.g.

wash water, is fed in through an inlet branch 14. This wash water then enters the gap 31 through a gap 29 between guiding plate sections 24 and 22, thus causing displacement washing in the filter cake or pulp mat formed. The width of the gap 29 and with it, the amount of washing liquid added, is set by a cylinder 26. The filtrate can be fed into a collecting tank underneath the dewatering rolls 5 and/or 6 and drained off from there through outlet branches 28 and 28'.

Figure 3:
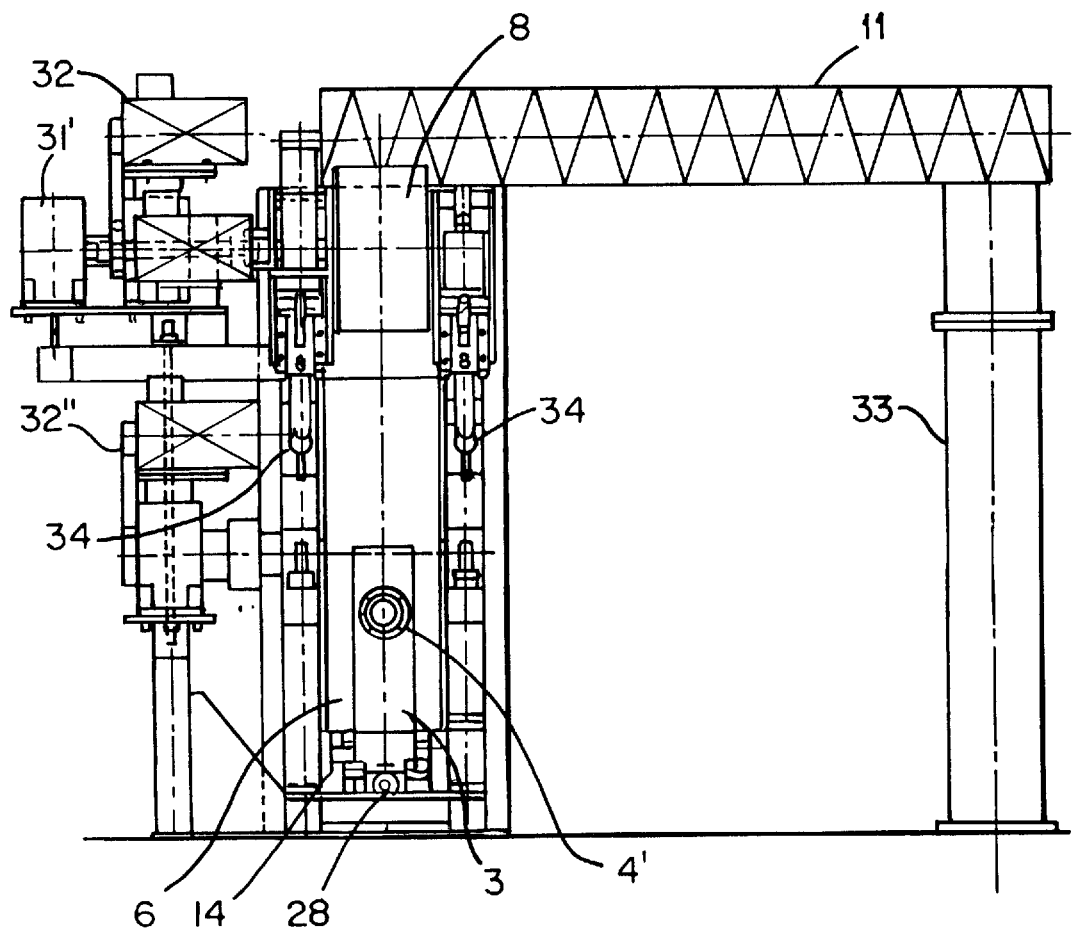
FIG. 3 shows a view as indicated by arrow III in FIG. 1, FIG. 4 a sectional view across the line IV—IV in FIG. 2, FIG. 5 contains a cut-out V from FIG. 4.

FIG. 3 shows a view as indicated by arrow III in FIG. 1, illustrating not only the drive 32 for the pulp discharge screw 11, but also the drives 32' for the press roll and the main drive 32" for the dewatering roll 6.

A single suspension supply would also be feasible. Furthermore, the filtrates could be split into different grades and put to different uses.

At the end of the pulp discharge screw 11 there is a chute 33. This figure also shows the positioning cylinder 34 for the stretcher and regulating rolls.

The sectional view shown in FIG. 4 shows the dewatering roll 6, designed as a perforated roll. The hollow roll 6 is mounted here on a shaft 35. The wire 10 runs over the perforated roll shell 36. The guiding plate 22 connected to the tank 3 is also illustrated. The cut-out V in FIG. 5 shows, in particular, the seal 38 between the tank 3 and the wire 10, with the perforations 37 in the roll shell 36 also being indicate here.

FIG. 5a shows the surface of a dewatering roll 5 and/or 6 in the form of a perforated roll. The perforations 37 can either be arranged over the roll shell 36 in rows, as shown in the left-hand section, or offset, as shown on the right-hand side.

FIG. 6 shows a further variant of a dewatering roll 5 and/or 6, designed as a grooved roll. FIG. 6a contains a sectional view of this roll. Here, grooves 39 interchange with ridges 40 in the in circumferential direction round the shell 36 of the roll 5 and/or 6, which is pivoted round axis 41. The wire 9 and 10, respectively, then rests on the ridges 40 (see FIG. 6a).

Figure 8:
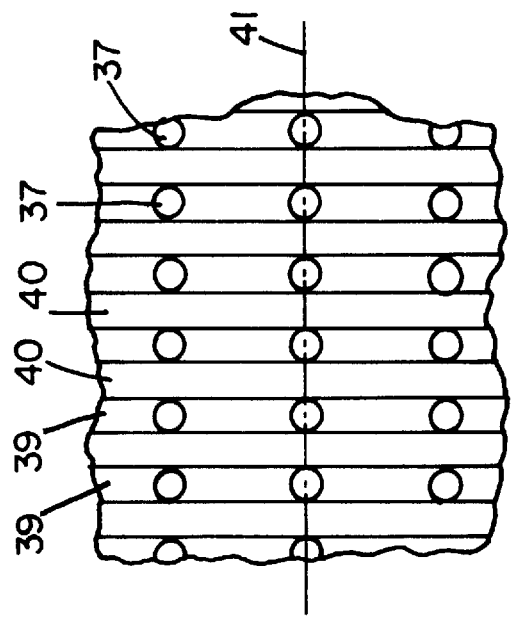
Figure 8A:
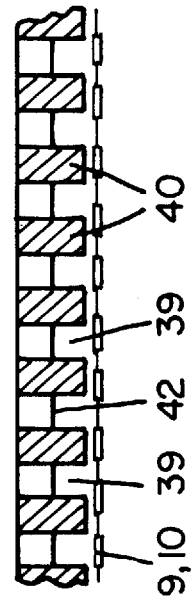
Figure 7:
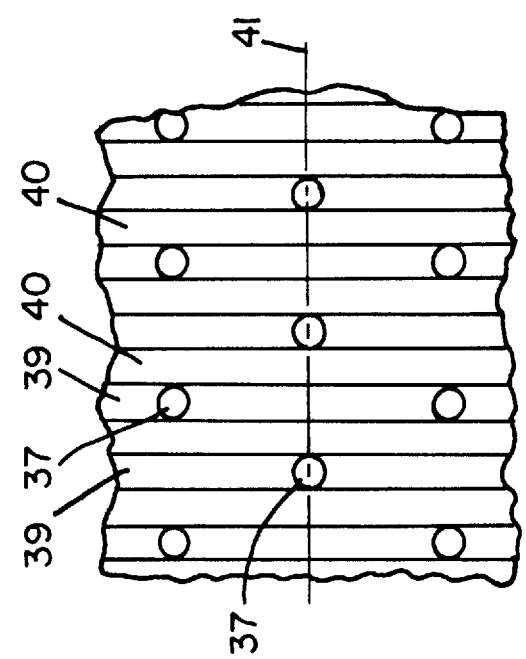
FIG. 7a shows a sectional view of FIG. 7, FIG. 8 a further variant of a grooved roll and FIG. 8a contains a sectional view of FIG. 8.
Figure 7A:
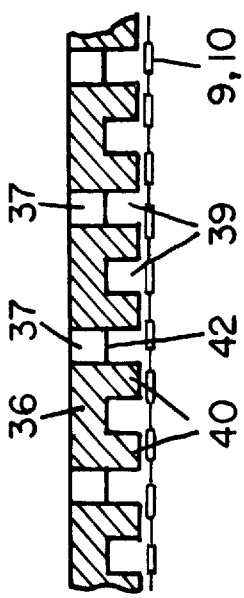

FIGS. 7 and 7a show a further development of a grooved roll 5 and/or 6, in which there are offset perforations 37 in the roll shell 36 in the base 42 of the grooves 39. The grooves 39 in between form a channel on the level shown in the section. The perforations 37 can, however, also be arranged in rows as shown in FIGS. 8 and 8a.

The invention is not limited to the designs shown in the enclosed drawings. The guiding plates, for example, can be divided into more than two sections. For dewatering applications only.

We claim:

1. Apparatus for dewatering and/or washing suspensions to form a dewatered mat, with two dewatering rolls (5, 6) rotating in opposite directions, where at least a further two rolls (7, 8) are provided and a woven belt (9, 10) runs over each combination of one dewatering roll (5, 6) and one further roll (7, 8), by which arrangement the suspension to be dewatered and/or washed is carried in a vertically extending slot between the two belts (9, 10) to form a web and dewatered in turn between the dewatering rolls (5, 6) and the further rolls (7, 8), wherein the improvement comprises that the dewatering rolls (5, 6) are arranged laterally above a tank (3) with part of the periphery of each of the dewatering rolls (5, 6) submerged in the tank (3), that a device (15) is located intermediate the dewatering rolls (5, 6) and the further rolls (7, 8) to guide and apply pressure on the web, and that curved guiding jackets (21, 22, 23, 24) are mounted over the width of both dewatering rolls (5, 6) to form an adjustable, narrowing suspension inlet gap (30, 31) between the guiding jackets (21, 22, 23, 24) and the belts (9, 10) which run over said periphery of the dewatering rolls (5, 6) and then over the further rolls (7, 8).

2. Apparatus according to claim 1, wherein the guiding jackets (21, 22, 23, 24) are mounted on swivel bearings.

3. Apparatus according to claim 1 wherein each of the guide jackets is divided into at least two relatively adjustable sections (21, 23 or 22, 24).

4. Apparatus according to claim 3 wherein each guide jacket has a fixed and a movable section and at least the fixed section of the guiding jackets (21, 22) being tightly connected to the tank (3) and wherein the tank has a separate section (27) to receive washing liquid and direct the washing liquid between the movable and fixed sections into said inlet gap.

5. Apparatus according to claim 1, wherein the dewatering rolls (5, 6) form an adjustable roll gap of up to 100 mm.

6. Apparatus according to claim 1, wherein the suspension is supplied separately and from opposite lateral sides (4, 4') of the tank (3) to a respective two inlet gaps.

7. Apparatus according to claim 1, wherein the tank (3) is sealed against the belt at the periphery of the dewatering rolls (5, 6) by radial-action seals (38).

8. Apparatus according to claim 1, including means cooperating with the tank (3) for displacing the tank out of an operating position into a cleaning position.

9. Apparatus according to claim 1, including filtrate drains being provided underneath the further rolls (7, 8).

10. Apparatus according to claim 1, including a stretcher roll (12, 13) to apply and regulate the belt tension being provided for each belt (9, 10) after the further roll (7, 8) and before the dewatering roll (5, 6) when viewed in the running direction of the belts (9, 10) wrapped round the dewatering rolls (5, 6).

11. Apparatus according to claim 10, wherein the stretcher roll (12, 13) is a regulating roll for belt centering.

12. Apparatus according to claim 1, including drive means for one of the further rolls (7, 8).

13. Apparatus according to claim 12, wherein the main drive load of the apparatus is taken from the one further roll (7, 8).

14. Apparatus according to claim 1, wherein the further rolls (7, 8) each have a smooth surface.

15. Apparatus according to claim 1, wherein the further rolls (7, 8) each have a rubber covering.

16. Apparatus according to claim 1, wherein the further rolls (7, 8) each have a grooved surface.

17. Apparatus according to claim 1, wherein by the further rolls (7, 8) each have bore holes in the surface.

18. Apparatus according to claim 1, wherein each of the further rolls (7, 8) is perforated.

19. Apparatus according to claim 1, including a hood (20) being provided over the tank (3) and all rolls.

20. Apparatus according to claim 1, wherein each of the dewatering rolls (5, 6) is perforated.

21. Apparatus according to claim 1, wherein the dewatering rolls (5, 6) each have grooves (39) in the periphery (36).

22. Apparatus according to claim 3, wherein the guiding jackets are mounted on swivel bearings.

23. Apparatus according to claim 3, wherein the tank is sealed against the belt at the periphery of the dewatering rolls by radial-action seals.

24. Apparatus according to claim 4, wherein the tank is sealed against the belt at the periphery of the dewatering rolls by radial-action seals.

25. Apparatus for dewatering and/or washing suspensions to form a dewatered mat, with two dewatering rolls (5, 6) rotating in opposite directions, where at least a further two rolls (7, 8) are provided and a woven belt (9, 10) runs over each combination of one dewatering roll (5, 6) and one further roll (7, 8), by which arrangement the suspension to be dewatered and/or washed is carried in a vertically extending slot between the two belts (9, 10) to form a web and dewatered in turn between the dewatering rolls (5, 6) and the further rolls (7, 8), wherein the improvement comprises that the dewatering rolls (5, 6) are arranged laterally above a tank (3) with part of the periphery of each of the dewatering rolls (5,6) submerged in the tank (3), that a device (15) is located intermediate the dewatering rolls (5, 6) and the further rolls (7, 8) to guide and apply pressure on the web, and that take-off means (11) are situated above the further rolls (7,8) for removing the dewatered mat as the mat emerges from said vertical slot wherein the take-off means have walls (11) being designed as doctors.

26. Apparatus for dewatering and/or washing suspensions to form a dewatered mat, with two dewatering rolls (5, 6) rotating in opposite directions, where at least a further two rolls (7, 8) are provided and a woven belt (9, 10) runs over each combination of one dewatering roll (5, 6) and one further roll (7, 8), by which arrangement the suspension to be dewatered and/or washed is carried in a vertically extending slot between the two belts (9, 10) to form a web and dewatered in turn between the dewatering rolls (5, 6) and the further rolls (7, 8), wherein the improvement comprises that the dewatering rolls (5, 6) are arranged laterally above a tank (3) with part of the periphery of each of the dewatering rolls (5, 6) submerged in the tank (3), that a device (15) is located intermediate the dewatering rolls (5, 6) and the further rolls (7, 8) to guide and apply pressure on the web, that said device to guide and apply pressure on the web is one of a guide roll or sliding plate, and that curved guiding jackets are mounted over the width of both dewatering rolls to form an adjustable, narrowing suspension inlet gap between the guiding jackets and the belts which run over the surface of the dewatering rolls and then over the further rolls.

27. Apparatus according to claim 16, wherein the guiding jackets are mounted on swivel bearings.

28. Apparatus according to claim 27, wherein each of the guide jackets is divided into at least two relatively adjustable sections.

29. Apparatus according to claim 28, wherein each guide jacket has a fixed and a movable section and at least the fixed section of the guiding jackets being tightly connected to the tank and wherein the tank has a separate section to receive washing liquid and direct the washing liquid between the movable and fixed sections into said inlet gap.

30. Apparatus according to claim 28, wherein the tank is sealed against the belt at the periphery of the dewatering rolls by radial-action seals.

31. Apparatus according to claim 29, wherein the tank is sealed against the belt at the periphery of the dewatering rolls by radial-action seals.

\* \* \* \* \*